United States Patent [19]
Ward

[11] 3,831,106
[45] Aug. 20, 1974

[54] Q SWITCHED LASERS
[75] Inventor: Ronald Douglas Ward, Dunfermline, Scotland
[73] Assignee: Ferranti Limited, Hollinwood, Lancashire, England
[22] Filed: Feb. 7, 1973
[21] Appl. No.: 330,405

[30] Foreign Application Priority Data
Feb. 11, 1972 Great Britain.................6408/72

[52] U.S. Cl. ............................................ 331/94.5 Q
[51] Int. Cl. .............................................. H01s 3/00
[58] Field of Search .................................. 331/94.5

[56] References Cited
UNITED STATES PATENTS
3,571,744  3/1971  Hook et al. ....................... 331/94.5

Primary Examiner—William L. Sikes
Attorney, Agent, or Firm—Cameron, Kerkam, Sutton, Stowell & Stowell

[57] ABSTRACT

A Q-switched laser has its optical cavity defined by two right-angled prisms arranged with their hypotenuse faces towards one another and normal to the optical axis of the laser. The apex lines of the two prisms are perpendicular to one another. The optical cavity contains the laser active medium and means for exciting the medium, and also an electro-optic birefringent Q-switching device aligned with its fast axis parallel to the apex line of one of the prisms. A beam-splitting polariser is located between the Q-switching device and one prism.

5 Claims, 1 Drawing Figure

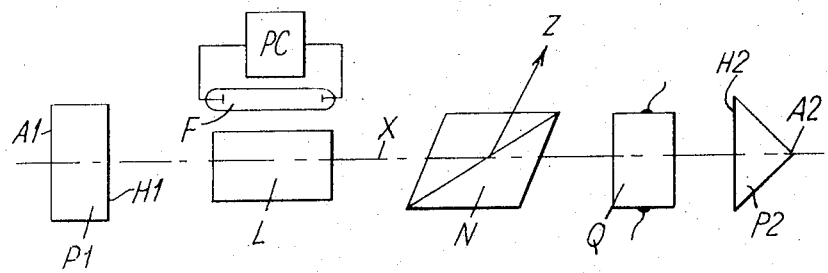

Q SWITCHED LASERS

This invention relates to Q-switched lasers of the type comprising an active medium located in an optical cavity and excited by suitable pumping means.

Q-switched lasers are used where the output radiation is required in bursts rather than continuously, in applications such as range-finding equipment. As is the case with continuous-output lasers the amount of power developed by modern Q-switched lasers is increasing. This causes a particular problem in the case of the laser in which the Q-switching element is a crystal of material having electro-optical properties such that it may be used as a "light-switch." It has been found that at high power levels the material of the Q-switching crystal may be damaged by the radiation passing through it, as is the case where the optical cavity is defined by two reflectors one of which allows part of the incident radiation to pass through it to form the output beam. This problem may be overcome by including in the optical cavity a phase plate and beam-splitting polariser which allows radiation polarised in one plane to pass through it to an end reflector of the cavity whilst causing radiation polarised in an orthogonal plane to be deflected out of the cavity to form an output beam of radiation.

A further problem which arises is that of providing and maintaining accurate alignment of the end reflectors of the optical cavity, as is necessary if mirrors are used. Lasers may frequently be used in situations where they are subject to mechanical shock, such as on earth-moving equipment, and in such situations precise mirror alignment is difficult and expensive to maintain. It is known to overcome this problem in lasers which do not employ Q-switching crystals by using totally reflecting right-angled prisms as end reflectors. Hitherto such prisms have not been used in electro-optically Q-switched lasers because of the polarisation effects accompanying total internal reflection which affect the Q-switching action, itself dependent on polarisation.

It is an object of the invention to provide a Q-switched laser the optical cavity of which includes a polarising beam-splitter in which the problem of providing and maintaining accurate reflector alignment is avoided.

According to the present invention there is provided a Q-switched laser which includes a pair of right-angled prisms arranged with their hypotenuse faces directed towards one another and substantially normal to the laser optical axis and with their right-angle apex lines substantially perpendicular to one another to define an optical cavity, a laser medium located within the optical cavity, means for stimulating the active medium to cause laser action, an electro-optical birefringent Q-switching device located within the optical cavity with its fast axis parallel to the apex line of one of said prisms, and a beam-splitting polariser located between the laser active medium and the Q-switching device with its pass plane at a substantial angle to the fast and slow axes of the Q-switching device.

Preferably the beam-splitting polariser is arranged with its pass-plane at 45° to the fast and slow axes of the Q-switching device.

The term "a substantial angle" is used above to indicate that the angle may have any value reasonably different from zero or 90°.

The fast and slow axes of the Q-switching device are the axes defining directions of polarisation within the crystal for which radiation passing through the crystal is propagated with maximum and minimum velocities respectively.

The pass plane of the beam-splitting polariser is that plane in which radiation passing through the beam-splitter towards the adjacent right-angled prism is polarised on emergence from the beam-splitter.

An embodiment of the invention will now be described with reference to the accompanying drawing. This shows a schematic side view of a laser incorporating the invention.

Referring now to the drawing, a laser rod L is located in an optical cavity defined by two right-angled prisms P1 and P2. These two prisms are arranged with their hypotenuse faces H1 and H2 directed towards one another and substantially normal to the laser optical axis X. The two prisms also have their right-angle apex lines A1 and A2 arranged substantially perpendicular to one another. A flash tube F is arranged near to the laser rod L, though the usual reflector enclosing the rod and the flash tube has been omitted for clarity. The flash tube F is energised by a pulse circuit PC. A Q-switching device Q is located in the optical cavity between the laser rod L and one of the prisms, and is aligned so that its fast axis is parallel to the right-angle apex line of one of the prisms. It follows that its slow axis is thus aligned parallel to the right-angle apex line of the other prism. The Q-switching device is an electro-optic birefringent element in which the degree of birefringence may be changed by the application of an electric field across the device. Materials such as potassium di-deuterium phosphate or lithium niobate are suitable materials for this purpose.

A beam-splitting polariser in the form of a Nicol prism N is located between the laser rod L and the Q-switching device Q. The polarising prism is aligned so that its pass plane is substantially at 45° to the fast and slow axes of the Q-switch, and hence at 45° to the hypotenuse apex lines of the two prisms.

Consider now the operation of the laser when the Q-switching device is in a state which allows normal laser operation to take place. The flash tube F is excited by the pulse circuit PC to produce an intense burst of radiation which is applied to the laser rod L by the reflector (not shown). This high intensity radiation causes changes in energy levels of the electrons of the laser active material, and the subsequent return of the electrons to their original energy levels results in the emission of radiation from the laser rod L. This radiation may be polarised or not, depending upon the material and shape of the laser rod.

Radiation incident upon the Nicol prism N emerges polarised in the pass plane of the Nicol, the passes through the Q-switch Q. The plane polarised radiation incident upon the Q-switch may be regarded as having two components polarised along the fast and slow axes and propagated along axis X of the Q-switch crystal with different velocities. The phase-shift occurring between the two components is dependent upon the magnitude of the electric field applied across the Q-switch.

Because of the selected orientation of the prism relative to the Q-switch crystal the two components are incident upon the first reflecting surface of the prism P2 one with its plane of polarisation in, and the other with its plane of polarisation normal to the plane of incidence. Incidence on the second reflecting surface is similar.

Since total internal reflection involves a phase-shift which is different for light polarised in, and light polarised normal to the plane of incidence, each reflection produces a further differential phase-shift between the two components.

Also, because of the selected orientation which ensures that the component vectors are either normal to, or in, the plane of incidence and are not inclined thereto so as each to be resolvable both in and normal to the plane of incidence, thereby resulting in two vectors of different phase and possibly magnitude, the differential phase shifts are simply additive.

The returning radiation from prism P2 passes back through the Q-switch where a further differential phase-shift is added.

To enable laser action to occur, the radiation incident upon the polarising Nicol prism N must be plane polarised in the pass plane of the polariser. If this is not the case two things will occur. Firstly part of the radiation may be reflected from the plane of section of the polariser to form a spurious output beam. Secondly, the energy loss resulting from this could be sufficient to prevent laser action.

The plane polarised radiation passing through the Nicol prism N is amplified during its passage through the laser rod L and emerges to enter the prism P1. In its passage through the prism it becomes elliptically polarised or, if it has already become elliptically polarised in its passage through the laser rod, the differential phase shift is changed. The radiation then passes back through the laser rod L onto the Nicol prism N. The component of the radiation incident upon the Nicol prism which is polarised in the pass plane of the Nicol prism is transmitted through the prism to maintain laser action, whilst the component of the radiation polarised in the orthogonal plane is reflected out of the optical cavity to form the output beam Z.

To ensure that the radiation incident upon the polariser is correctly polarised, the total differential phase shift resulting from the radiation passing twice through the Q-switch and once through prism P2 must be either zero or a multiple of $2\pi$. Similarly, for laser action to be completely stopped, the radiation incident upon the polariser from the Q-switch should be plane polarised in a plane perpendicular to the pass plane of the Nicol polariser, so that no radiation passes through it. This is achieved by ensuring that the total differential phase shift resulting from the radiation passing twice through the Q-switch and once through prism P2 must be an odd multiple of $\pi$. These conditions apply because of the relative alignments of prisms P1 and P2, and Q-switch Q specified above. Other relative alignments of Q-switch and prisms would introduce the problem of compounding two vectors of different phases and amplitudes as described above. Since the magnitudes are dependent also on the orientation of the polariser pass plane with respect to the Q-switch, the use of such other alignments would severely restrict the design, whereas in the preferred alignment the orientation of the polariser pass plane is not critical. Moreover, with other alignments, switching voltages applied to the Q-switch may be inconveniently high, and the change in voltage required to switch the laser from the "on" to the "off" condition may be other than the half-wave voltage. It should be remembered that from purely geometric considerations the differential phase shift due to reflection from the two faces of the prism is 180°.

In the case of a Q-switch material which is not birefringent in the absence of an electric field, the use of simple mirror reflectors requires the voltage producing the field to be changed from a certain value necessary to block the Q-switch to zero volts. However, in order to increase the switching speed of the Q-switch it is known to reverse the polarity of the applied voltage to cause the switch to "open." The use of prisms in place of the simple mirrors, as in the present invention, results in the need to provide a permanent bias voltage the magnitude of which depends upon the differential phase shift introduced by the prism P2. If, as a result, the voltage required to "open" the switch is of the same polarity as, but of smaller magnitude than, that required to "block" the switch, then the former voltage may be made zero to simplify the Q-switch control circuitry.

In some instances a Q-switch material of the type which requires the application of an electric field to "block" the passage of radiation through it suffers from the disadvantage that the field, and hence the blocking action, may not be uniform. This problem may be overcome by coating the two reflecting surfaces of the prism P2 so that the differential phase shift at these surfaces due to total internal reflection is zero. Hence to block the laser action the Q-switch is required to produce zero differential phase shift, which it does in the absence of any applied field.

Although the polarising prism is aligned in the above embodiment with its pass plane at 45° to the fast and slow axes of the Q-switching device, this alignment is not essential. The polariser may be aligned at any angle between zero and 90° other than angles very close to those two extremes. The value of the angle will have some effect upon the proportion of radiation reflected out to form the output beam Z. Thus some control may be exerted over the power output of the laser by suitable setting of the angle.

The beam-splitting polariser need not be a Nicol prism as described above.

The reflecting surfaces of the other prism P1 may be coated to control the eccentricity of the elliptical polarisation and hence to control the proportion of the radiation diverted to form the output beam Z.

The use of a pair of prisms as reflectors, aligned with their right angle apex lines orthogonal removes the necessity for very precise alignment of the reflectors to be achieved or maintained.

The embodiment described above uses a rod of laser active material, and this may be of any one of the usual materials. Alternatively the rod may be replaced by some other active medium, such as an envelope containing a gas mixture. In this case it may be necessary to replace the flash tube F by other means, such as discharge electrodes.

What we claim is:

1. A Q-switch laser which includes a pair of right-angled prisms arranged with their hypotenuse faces directed towards one another and substantially normal to the laser optical axis and with their right-angle apex lines substantially perpendicular to one another to define an optical cavity, a laser active medium located within the optical cavity, means for stimulating the active medium to cause laser action, an electro-optical birefringent Q-switching device located within the optical cavity with its fast axis parallel to the apex line of one of said prisms, and a beam-splitting polariser located between the laser active medium and the Q-switching device with its pass plane at substantial angles to the fast and slow axes of the Q-switching device.

2. A laser as claimed in claim 1 in which an output beam of radiation is diverted from the optical cavity by the beam-splitting polariser, the power in the output beam being determined by the angles between the pass plane of the polariser and the fast and slow axes of the Q-switching device.

3. A laser as claimed in claim 1 in which the beam-splitting polariser is arranged with its pass plane at 45° to the fast and slow axes of the Q-switching device.

4. A laser as claimed in claim 1 in which the beam-splitting polariser is a Nicol prism.

5. A laser as claimed in claim 1 in which the laser active medium is a solid medium, the means for stimulating the active medium being at least one high-intensity light source.

* * * * *